(12) United States Patent
Saitou

(10) Patent No.: US 9,676,072 B2
(45) Date of Patent: Jun. 13, 2017

(54) MACHINING DEVICE WITH VISUAL SENSOR FOR LOCATING CONTAMINANTS

(71) Applicant: FANUC Corporation, Yamanashi (JP)

(72) Inventor: Kiwamu Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/979,493

(22) Filed: Dec. 27, 2015

(65) Prior Publication Data

US 2016/0184945 A1    Jun. 30, 2016

(30) Foreign Application Priority Data

Dec. 25, 2014  (JP) ................................. 2014-263104

(51) Int. Cl.
    *B23Q 17/24*     (2006.01)
    *B23Q 7/16*      (2006.01)
    (Continued)

(52) U.S. Cl.
    CPC ............. *B23Q 7/04* (2013.01); *B23Q 7/1431* (2013.01); *B23Q 11/0042* (2013.01);
    (Continued)

(58) Field of Classification Search
    CPC ................ B23Q 17/24; B23Q 17/2404; B23Q 17/2409; B23Q 17/2414; B23Q 17/2419; B23Q 17/2423; B23Q 17/2428; B23Q 17/2433; B23Q 17/2438; B23Q 17/2442; B23Q 17/2447; B23Q 17/2452; B23Q 17/2457; B23Q 17/2461; B23Q 17/2466;
    (Continued)

(56) References Cited

U.S. PATENT DOCUMENTS 4,844,678 A * 7/1989 Schenk .................. B23Q 3/066
                                                     269/309
6,227,787 B1 * 5/2001 Spicher ................ B23Q 7/1431
                                                     414/416.01
(Continued)

FOREIGN PATENT DOCUMENTS

DE         19956343 A1 *  5/2001
EP          2163342 A2     3/2010
(Continued)

OTHER PUBLICATIONS

Machine Translation DE 19956343-A1, which DE '343 was published May 2001.*

(Continued)

*Primary Examiner* — Erica E Cadugan
(74) *Attorney, Agent, or Firm* — Hauptman Ham, LLP

(57) ABSTRACT

A machining device is provided with a machine tool, a pallet to which a workpiece is secured, a pallet changer configured to move and change the pallet, and a workpiece attaching unit configured to attach and detach the workpiece to and from the pallet. Further, the machining device is provided with a visual sensor configured to capture an image of the pallet, and contaminants that may possibly cause jamming as the workpiece is supplied to the pallet are detected from the image captured by the visual sensor. A workpiece supply operation for the pallet is suspended if the contaminants are detected.

10 Claims, 5 Drawing Sheets

(51) Int. Cl.
*B23Q 7/04* (2006.01)
*B23Q 7/14* (2006.01)
*B23Q 11/00* (2006.01)
*B25J 9/00* (2006.01)
*B25J 13/08* (2006.01)
*B25J 9/16* (2006.01)
*B23Q 17/00* (2006.01)

(52) U.S. Cl.
CPC ..... *B23Q 17/2452* (2013.01); *B23Q 17/2471* (2013.01); *B23Q 17/2476* (2013.01); *B25J 9/1697* (2013.01); *B25J 13/08* (2013.01); *B23Q 17/005* (2013.01); *Y02P 70/171* (2015.11); *Y10S 901/47* (2013.01); *Y10T 29/5196* (2015.01); *Y10T 409/304088* (2015.01)

(58) Field of Classification Search
CPC ............ B23Q 17/2471; B23Q 17/2476; B23Q 17/248; B23Q 17/2485; B23Q 17/249; B23Q 17/2495; B23Q 7/00–7/18; B23Q 2707/00–2707/16; B23Q 2717/00–2717/006; B23Q 11/0042–11/0075; B23Q 1/66; B23Q 7/1431; B25J 13/08–13/089; B25J 19/04; B25J 19/02; B25J 19/021; B25J 19/022; B25J 19/023; B25J 19/025; B25J 19/06; B25J 19/061; B25J 19/1697; Y10S 901/47; Y10T 409/30532; Y10T 409/305432; Y10T 409/306048; Y10T 409/306104; Y10T 29/5196; Y10T 29/5124; Y10T 483/16; Y10T 483/165; Y10T 409/304088

USPC .................... 901/47; 700/259; 29/33 P, 563; 409/159, 161, 172, 173, 137; 198/345.3, 198/346.1; 483/14–15

See application file for complete search history.

(56) References Cited

U.S. PATENT DOCUMENTS

| | | | | |
|---|---|---|---|---|
| 6,665,588 | B2 * | 12/2003 | Watanabe | ................ B23Q 7/04 414/796.5 |
| 2001/0029970 | A1 * | 10/2001 | Kantola | .................... B08B 3/02 134/32 |
| 2004/0037689 | A1 * | 2/2004 | Watanabe | .............. B25J 9/1697 414/730 |
| 2006/0000687 | A1 | 1/2006 | Kojima et al. | |

FOREIGN PATENT DOCUMENTS

| | | | |
|---|---|---|---|
| JP | 1-175192 | U | 12/1989 |
| JP | 5-285800 | A | 11/1993 |
| JP | 7-53880 | Y2 | 12/1995 |
| JP | 11-58187 | A | 3/1999 |
| JP | 11-207561 | A | 8/1999 |
| JP | 2001-322049 | A * | 11/2001 |
| JP | 2003-71766 | A | 3/2003 |
| JP | 2003-225841 | A | 8/2003 |
| JP | 2006-43866 | A | 2/2006 |
| JP | 2009-90388 | A | 4/2009 |
| JP | 2012-187641 | A | 10/2012 |
| JP | 2014-83589 | A | 5/2014 |

OTHER PUBLICATIONS

Decision to Grant a Patent in JP Application No. 2014-263104, mailed Feb. 2, 2016.

* cited by examiner

MACHINING DEVICE WITH VISUAL SENSOR FOR LOCATING CONTAMINANTS

RELATED APPLICATIONS

The present application claims priority to Japanese Application Number 2014-263104, filed Dec. 25, 2014, the disclosure of which is hereby incorporated by reference herein in its entirety.

BACKGROUND OF THE INVENTION

Field of the Invention

The present invention relates to a machining device with a workpiece attaching unit, having functions of monitoring contaminants on a pallet by means of a visual sensor and locating those contaminants which may possibly cause jamming as a workpiece is secured to the pallet.

Description of the Related Art

In a machining device comprising a pallet changer configured to automatically change a pallet to which a workpiece is secured, as is generally known, if contaminants such as chips adhere to a workpiece securing portion of the pallet, jamming by the contaminants may possibly cause a misalignment of a workpiece securing position or a workpiece fixation failure. There is a known device in which contaminants are cleaned with a fluid when the workpiece or the pallet is changed.

Japanese Patent Applications Laid-Open Nos. 2006-43866 and 11-207561 disclose techniques related to pallet change using a robot. Japanese Patent Application Laid-Open No. 5-285800 discloses a system in which a robot with a camera is used for workpiece change. Japanese Patent Application Laid-Open No. 2009-090388 discloses a technique for cleaning a workpiece securing portion of a pallet. Japanese Utility Model Application Laid-Open No. 1-175192 and Japanese Patent Application Laid-Open No. 2003-225841 disclose a system configured to detect the support state of the workpiece or the pallet and perform contaminant cleaning. Japanese Examined Utility Model Application Publication No. 7-53880 discloses a system for monitoring contaminant adhesion to a workpiece.

SUMMARY OF THE INVENTION

The techniques disclosed in the above-described patent documents, however, have no function of monitoring the conditions of contaminant adhesion, so that they are subject to a problem that cleaning may be carried out despite the absence of contaminants. Further, there is another problem that contaminants remaining after the cleaning, if any, cannot be detected.

Specifically, there is no reference to the state of contaminant adhesion in Japanese Patent Applications Laid-Open Nos. 2006-43866 and 11-207561. There is no reference to monitoring of the conditions of contaminant adhesion in Japanese Patent Application Laid-Open No. 5-285800. There is no reference to a function of monitoring contaminants in Japanese Patent Application Laid-Open No. 2009-090388. There is no reference to functions of monitoring the state of contaminant adhesion before workpiece fixation and preventing possible jamming by contaminants in Japanese Utility Model Application Laid-Open No. 1-175192 and Japanese Patent Application Laid-Open No. 2003-225841. There is no reference to contaminant adhesion to the workpiece securing portion in Japanese Examined Utility Model Application Publication No. 7-53880.

Accordingly, the object of the present invention is to provide a machining device with a visual sensor for locating contaminants, capable of monitoring the state of contaminant adhesion and performing cleaning of a workpiece securing portion of a pallet only if necessary, thereby reducing cleaning time and saving the cleaning fluid, and of continuing the cleaning so that the contaminants can be removed, thereby reducing the possibility of jamming by the contaminants.

A machining device according to the present invention includes a machine tool, a pallet to which a workpiece is secured, a pallet changer configured to move the pallet and change the pallet in the machine tool, and a workpiece attaching unit configured to attach and detach the workpiece to and from the pallet. Further, the machining device includes a visual sensor configured to capture an image of the pallet outside a machining chamber of the machine tool, an information processor configured to process information from the visual sensor, thereby detecting contaminants that may possibly cause jamming as the workpiece is supplied to the pallet, and a workpiece supply suspension command output unit configured to output a command to suspend a workpiece supply operation to the pallet if the contaminants that may possibly cause jamming during the workpiece supply are detected.

The workpiece attaching unit may comprise a load sensor such that the workpiece supply operation is suspended if an abnormal load is detected by the load sensor during the workpiece supply to the pallet.

The workpiece attaching unit may be a robot.

The machining device may further comprise notifying means for notifying an operator of suspension of the workpiece supply.

The machining device may further comprise a contaminant removing unit configured to remove the contaminants adhering to the pallet, thereby allowing the contaminants to be removed by the contaminant removing unit if the workpiece supply operation is suspended. The image of the pallet may be captured by the visual sensor after the contaminants are removed by the contaminant removing unit and the workpiece supply may be continued if no contaminants that may possibly cause jamming during the workpiece supply to the pallet are detected. Further, the contaminant removing unit may be provided on the workpiece attaching unit.

The workpiece attaching unit may be configured to change the pallet.

The workpiece attaching unit may be configured to change the pallet and a pallet changing operation may be suspended if an abnormal load is detected during the pallet change.

The visual sensor may be mounted on the workpiece attaching unit.

According to the present invention, there can be provided a machining device with a visual sensor for locating contaminants, capable of monitoring the state of contaminant adhesion and performing cleaning only if necessary, thereby reducing cleaning time and saving the cleaning fluid, and of continuing the cleaning so that the contaminants can be removed, thereby reducing the possibility of jamming by the contaminants.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A robotic machining device with a visual sensor for locating contaminants according to the present invention will be described with reference to the external perspective view of FIG. 1 and the functional block diagram of FIG. 2.

Figure 1:
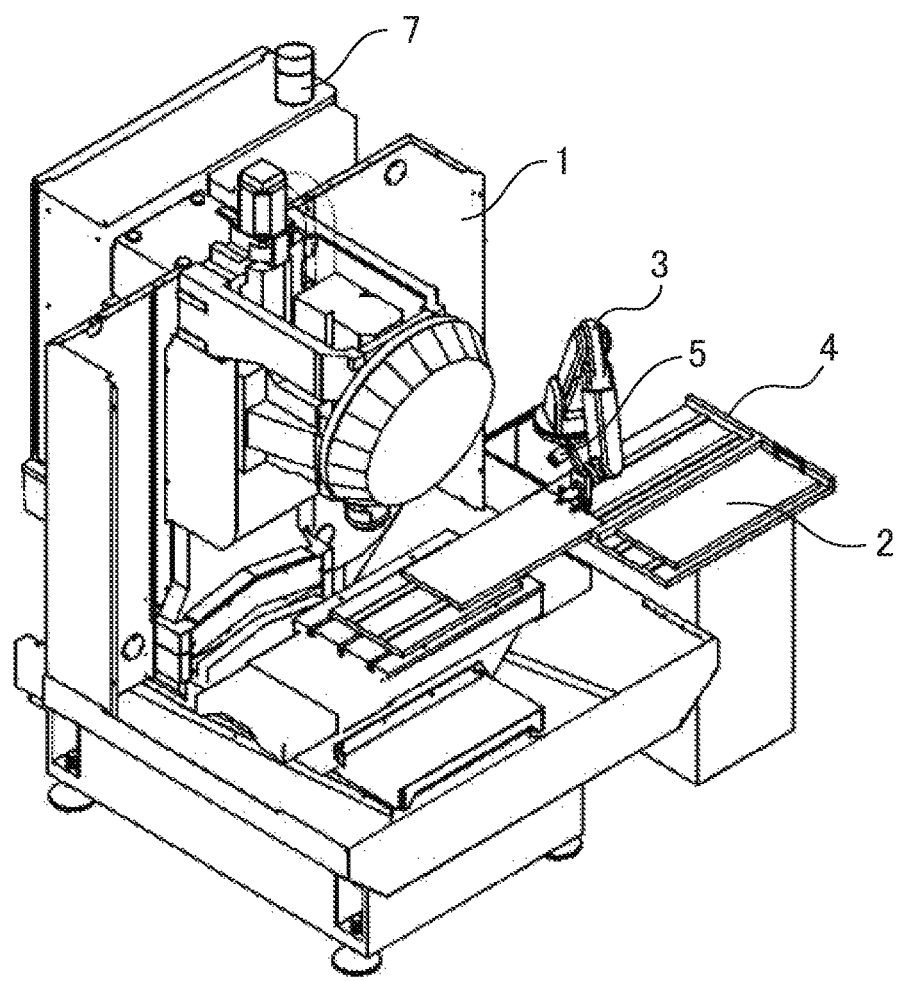
FIG. 1 is an external perspective view of a robotic machining device with a visual sensor for locating contaminants according to the present invention.
Figure 2:
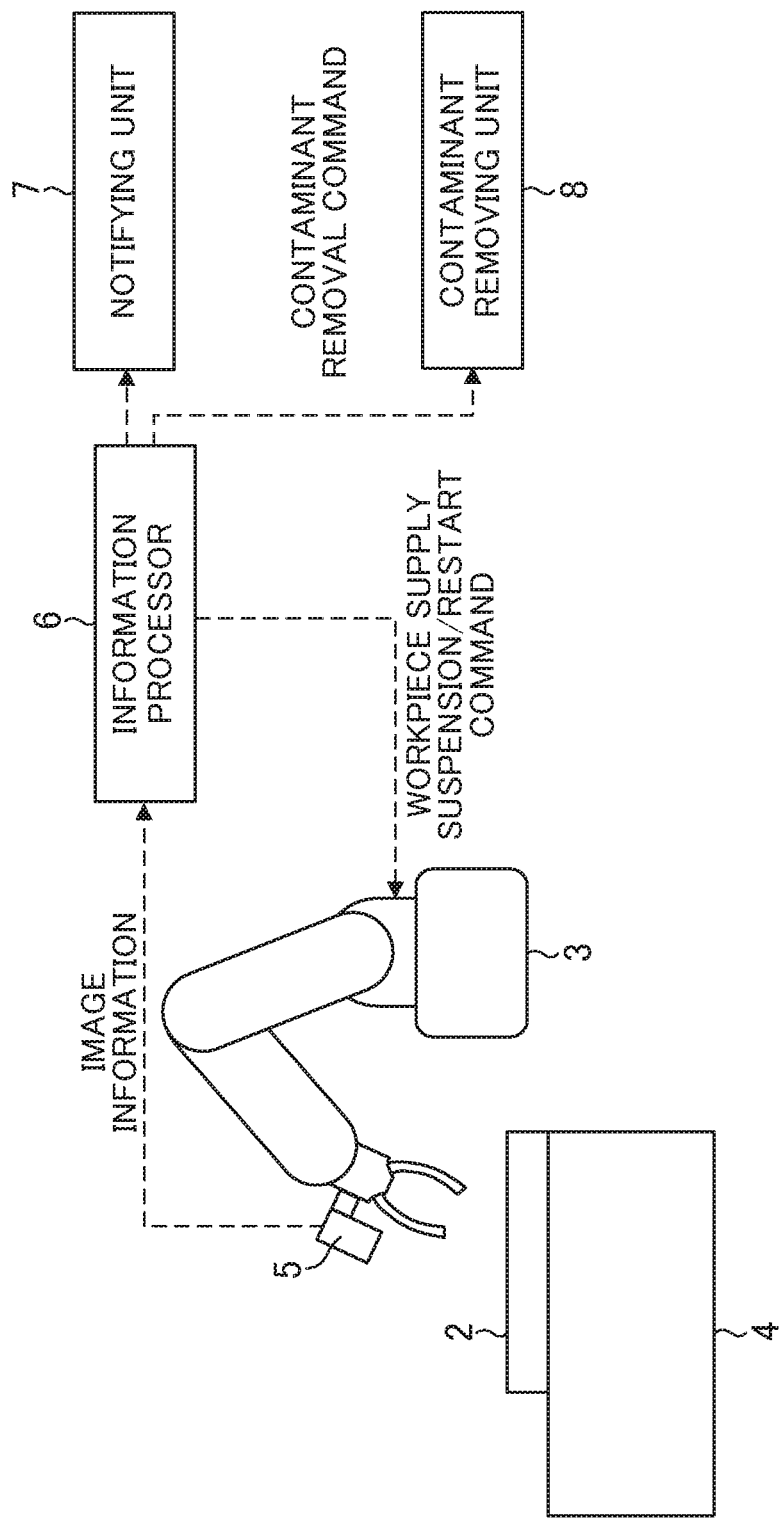
FIG. 2 is a functional block diagram of the robotic machining device of FIG. 1.

As shown in FIG. 1, the machining device comprises a machine tool 1, pallet 2, workpiece attaching unit 3, pallet changer 4, at least one visual sensor 5, and information processor 6. A workpiece can be secured to the pallet 2. The workpiece attaching unit 3 serves to attach and detach the workpiece to and from the pallet 2. The pallet changer 4 is used to change the pallet 2 in the machine tool 1. The information processor 6 processes information on the visual sensor 5.

The machining device has functions of monitoring contaminants on the pallet 2 by means of the visual sensor 5 and locating those contaminants which may possibly cause jamming as the workpiece is secured to the pallet 2. A gantry loader or robot may be used as the workpiece attaching unit 3. A robot is used as the workpiece attaching unit 3 in the machining device shown in FIG. 1. Alternatively, the workpiece attaching unit 3 may be used doubling as the pallet changer 4.

The machining device of FIG. 1 is configured so that an image of a workpiece securing portion (in a monitoring range) of the pallet 2 outside the machine tool 1 is captured by the visual sensor 5. However, the range whose image can be captured by the visual sensor 5 is not limited to the workpiece securing portion of the pallet 2. The visual sensor 5 may be mounted on the workpiece attaching unit 3.

Preferably, the monitoring of the contaminants by the visual sensor 5 should be performed before the next cycle of workpiece supply after workpiece machining is finished. However, the achievement of the contaminant monitoring is not limited to the period between the end of the workpiece machining and the next workpiece supply cycle, only if new contaminants are prevented from adhering to the monitoring range before the next cycle of workpiece supply to the pallet after the contaminant monitoring.

The information processor 6 (information processing unit) has a function of processing the information captured by the visual sensor 5, thereby detecting the adhesion of contaminants to the monitoring range and locations of the adhesion. The following methods may be used to detect the locations of the contaminant adhesion by images. However, the locations of the contaminant adhesion may also be detected by some other methods.

1. Method Based on Use of Differences in Color Between Contaminants and Monitoring Range The color of chips, main contaminants, is substantially determined by the material of the workpiece. Therefore, the monitoring range is colored differently from the contaminants in advance so that a portion whose color or luminosity is different from the original color or luminosity of the monitoring range by a predetermined threshold or more can be detected as a location of the contaminant adhesion.

2. Method Based on Use of Template Image

An image of monitoring range is previously captured in a state where no contaminants are adhered and is stored in advance as a normal template image. When the contaminants are monitored, the monitoring range image is captured in the same position and posture as those of the template image, and the captured image is compared with the template image. Thereupon, a portion where the two images are different in color or luminosity by a predetermined threshold or more is detected as a location of the contaminant adhesion.

3. Registration of Specific Portions Such as Workpiece Securing Portion on Pallet A specific portion such as a workpiece securing portion on a pallet is registered in advance as a portion in which adhering contaminants, if any, may possibly cause jamming during the workpiece supply. However, portions in which jamming by contaminants may occur are not limited to the workpiece securing portion on the pallet and may be suitably determined depending on the structure of the pallet changer and a workpiece fixing method. If at least one of the locations of the contaminant adhesion detected by the contaminant detection method is included in the portion in which contaminants may possibly cause jamming, the information processor 6 (information processing unit) determines the possibility of jamming by contaminants.

If it is determined that chips may possibly get jammed, the workpiece attaching unit 3 suspends the workpiece supply to the pallet 2. As an embodiment of the present invention, the machining device comprises notifying means 7 for notifying the suspension of the workpiece supply and/or a contaminant removing unit 8 for removing contaminants from those portions in which the jamming may possibly occur.

While the notifying means 7 may possibly be an alarm display on an information display screen, warning lamp, or alarm sound, it may also be another means. The contaminant removing unit 8 may be a unit either subordinate to or independent (like a robot having a hand fitted with a coolant gun) of the pallet changer 4. The workpiece attaching unit 3 may be used doubling as the contaminant removing unit 8.

If the machining device is not provided with the contaminant removing unit 8, the notifying means 7 notifies an operator of suspension, if any, of the workpiece supply operation, thereby urging the operator to remove contaminants. If the machining device comprises a contaminant removing unit, in contrast, the contaminant removing unit removes contaminants from the portions in which the jamming may possibly occur when the workpiece supply operation is suspended.

After the contaminant removal operation by the contaminant removing unit 8 or the operator is finished, another image is captured to monitor the state of contaminant adhesion by the visual sensor 5. If it is determined that contaminants remain in the portions in which they may possibly cause jamming even after the contaminant removal, the operator is notified of the determination again or the remaining contaminants are removed by the contaminant removing unit 8. Those contaminants which may possibly cause jamming are removed by repeating this operation so that no more contaminants are detected in the anticipated portions for jamming. If no contaminants are detected in the anticipated portions, the workpiece supply operation is continued (or restarted if it is suspended).

Figure 3:
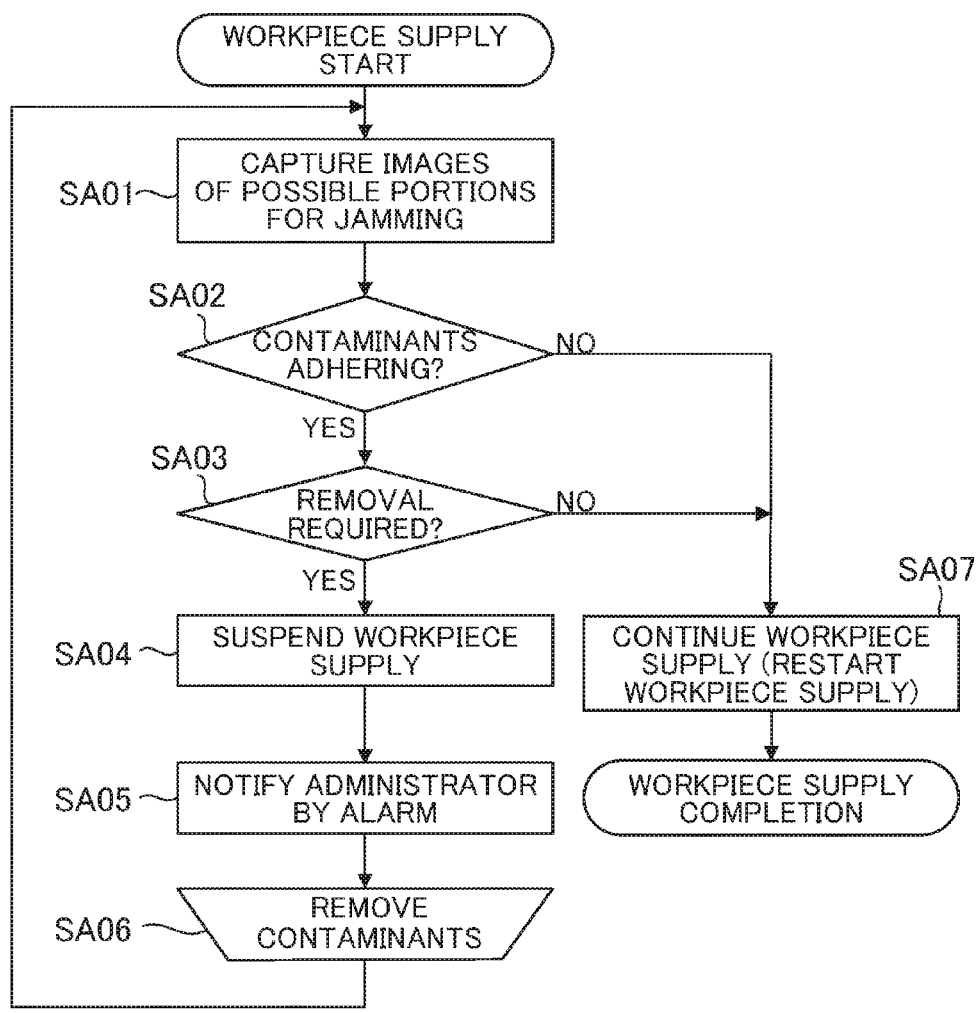
FIG. 3 is a flowchart showing procedure of contaminant detection/removal processing performed by the machining device without a contaminant removing unit.

FIG. 3 is a flowchart showing procedure of contaminant detection/removal processing performed by the machining device without the contaminant removing unit. The following is a sequential description of various steps of operation.

[Step sa01] If contaminants such as chips adhere to the workpiece securing portion of the pallet 2, images of the portions in which jamming by contaminants may possibly occur are captured by the visual sensor 5.

[Step sa02] It is determined by the captured images whether or not any contaminants are adhering to the workpiece securing portion of the pallet 2. If contaminants are adhering (YES), the processing proceeds to Step sa03. If not (NO), the processing proceeds to Step sa07.

[Step sa03] It is determined whether or not the contaminants adhering to the workpiece securing portion of the pallet 2 should be removed. If the removal is necessary (YES), the processing proceeds to Step sa04. If not (NO), the processing proceeds to Step sa07.

[Step sa04] The workpiece supply to the pallet 2 is suspended.

[Step sa05] An alarm is used to notify an operator of the necessity of removal of the contaminants adhering to the workpiece securing portion of the pallet 2.

[Step sa06] The contaminants are removed, whereupon the processing returns to Step sa01 and this processing is continued.

[Step sa07] Since no contaminants are adhering to the workpiece securing portion of the pallet 2 or adhering contaminants, if any, need not be removed, the workpiece supply to the pallet 2 is continued (or restarted).

Figure 4:
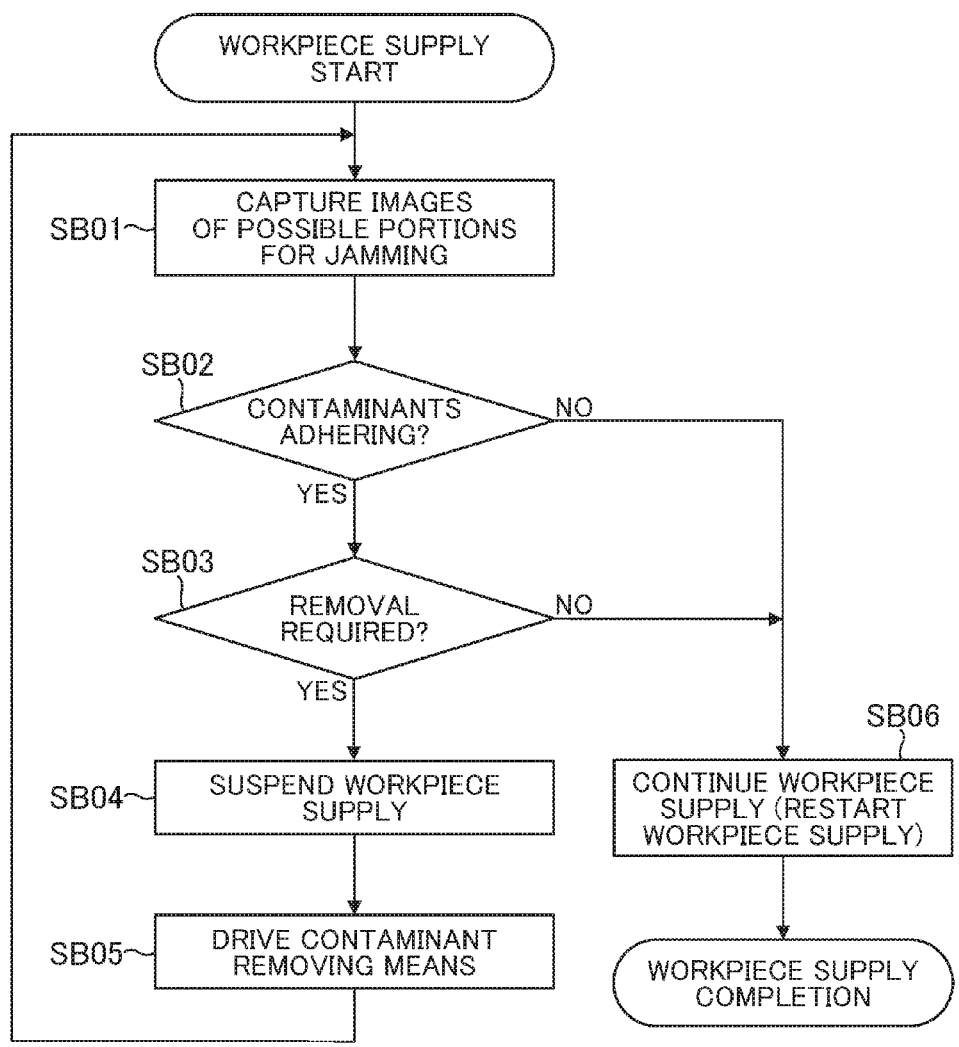
FIG. 4 is a flowchart showing procedure of contaminant detection/removal processing performed by the machining device with the contaminant removing unit.

FIG. 4 is a flowchart showing procedure of contaminant detection/removal processing performed by the machining device with the contaminant removing unit. The following is a sequential description of various steps of operation.

[Step sb01] If contaminants such as chips adhere to the workpiece securing portion of the pallet 2, images of the portions in which jamming by contaminants may possibly occur are captured by the visual sensor 5.

[Step sb02] It is determined by the captured images whether or not any contaminants are adhering to the workpiece securing portion of the pallet 2. If contaminants are adhering (YES), the processing proceeds to Step sb03. If not (NO), the processing proceeds to Step sb06.

[Step sb03] It is determined whether or not the contaminants adhering to the workpiece securing portion of the pallet 2 should be removed. If the removal is necessary (YES), the processing proceeds to Step sb04. If not (NO), the processing proceeds to Step sb06.

[Step sb04] The workpiece supply to the pallet 2 is suspended.

[Step sb05] The contaminant removing unit is driven to remove the contaminants, whereupon the processing returns to Step sb01 and this processing is continued.

[Step sb06] Since no contaminants adhere to the workpiece securing portion of the pallet 2 or adhering contaminants, if any, need not be removed, the workpiece supply to the pallet 2 is continued (or restarted).

Figure 5:
FIG. 5 schematically shows a load sensor of the workpiece attaching unit.

The workpiece attaching unit 3 will now be described additionally. The workpiece attaching unit 3 may comprise a tactile sensor. The tactile sensor of the workpiece attaching unit 3 is used to monitor the load generated when the workpiece is attached to the pallet or during pallet transportation, thereby detecting abnormality of the workpiece supply that cannot be detected by the visual sensor 5. FIG. 5 shows a load sensor of the workpiece attaching unit 3.

The following methods can be used for the detection of an abnormal load on the workpiece supply.

1. A specific value is previously set as at least one of upper and lower limit values of a normal load, and abnormality is determined if the tactile sensor detects a load deviated from its range. The upper and lower limit values of the normal load may be set for each process of work.

2. The necessary load for the workpiece attachment or pallet transportation is detected and stored in advance when the workpiece supply operation is normal so that abnormality can be determined if a load different from the stored load by a predetermined value or more is detected.

The following effects can be obtained by using the device of the above-described embodiment of the present invention.

Adhesion of contaminants to a movement path or the securing portion is monitored before the workpiece supply to the pallet so that the workpiece supply operation can be suspended to prevent possible jamming by contaminants. Further, the contaminants can be reliably removed by confirming their dropping by means of the visual sensor after the contaminant removal.

In general, the workpiece securing portion of the pallet 2 is not flat. In order to monitor the state of contaminant adhesion by means of a fixed camera or cameras, therefore, it is necessary to set a camera in an appropriate position or install a plurality of cameras. However, positions in which cameras can be set so as not to interfere with the workpiece or a jig are limited, so that the cameras cannot always be set in appropriate positions. Further, the installation of a plurality of cameras requires many spaces.

In contrast, the sensor position and angle can be variously changed by attaching visual sensors to the robot, so that the conditions of contaminant adhesion to the pallet can be monitored by fewer visual sensors than in the case where the fixed camera or cameras are used.

Furthermore, a fixation failure due to those contaminants which cannot be detected by the visual sensors or other factors can be detected by tactile sensors mounted on the robot and used in combination with the visual sensors. The load applied during the workpiece attachment to the pallet or the pallet transportation is monitored, and the workpiece attachment operation or pallet changing operation is suspended in case of detection of an abnormal load. If the detected load is excessive, there is the possibility of jamming by small contaminants that cannot be detected by a visual sensor, malfunction of a jig, or some other failure. If the detected load is too small, in contrast, wear of the jig or the like is caused, so that the resistance during the movement of the workpiece or the pallet may possibly be reduced.

The invention claimed is:

1. A machining device which comprises a machine tool, a pallet to which a workpiece is secured, a pallet changer configured to move the pallet and change the pallet in the machine tool, and a workpiece attaching unit configured to attach and detach the workpiece to and from the pallet, the machining device further comprising:

a visual sensor configured to capture an image of the pallet outside a machining chamber of the machine tool;

an information processor configured to process information from the visual sensor, thereby detecting contaminants that may possibly cause jamming as the workpiece is supplied to the pallet; and a workpiece supply suspension command output unit configured to output a command to suspend a workpiece supply operation to the pallet if the contaminants that may possibly cause jamming during the workpiece supply are detected.

2. The machining device according to claim 1, wherein the workpiece attaching unit comprises a load sensor such that the workpiece supply operation is suspended if an abnormal load is detected by the load sensor during the workpiece supply to the pallet.

3. The machining device according to claim 1, wherein the workpiece attaching unit is a robot.

4. The machining device according to claim 1, further comprising notifying means for notifying an operator of suspension of the workpiece supply.

5. The machining device according to claim 1, further comprising a contaminant removing unit configured to remove the contaminants adhering to the pallet, thereby allowing the contaminants to be removed by the contaminant removing unit if the workpiece supply operation is suspended.

6. The machining device according to claim 5, wherein the image of the pallet is captured by the visual sensor after the contaminants are removed by the contaminant removing unit and the workpiece supply is continued if no contaminants that may possibly cause jamming during the workpiece supply to the pallet are detected.

7. The machining device according to claim 5, wherein the contaminant removing unit is provided on the workpiece attaching unit.

8. The machining device according to claim 1, wherein the workpiece attaching unit is configured to change the pallet.

9. The machining device according to claim 1, wherein the workpiece attaching unit is configured to change the pallet and a pallet changing operation is suspended if an abnormal load is detected during the pallet change.

10. The machining device according to claim 1, wherein the visual sensor is mounted on the workpiece attaching unit.

* * * * *